United States Patent [19]

Van Eenam

[11] 4,222,921

[45] Sep. 16, 1980

[54] POLYAMINE/EPIHALOHYDRIN REACTION PRODUCTS

[75] Inventor: Donald N. Van Eenam, Des Peres, Mo.

[73] Assignee: Monsanto Company, St. Louis, Mo.

[21] Appl. No.: 916,631

[22] Filed: Jun. 19, 1978

[51] Int. Cl.$^2$ ............................................. C08F 2/10
[52] U.S. Cl. ................... 260/29.6 H; 525/336
[58] Field of Search ............... 260/29.6 H; 526/23

[56] References Cited

U.S. PATENT DOCUMENTS

| | | | |
|---|---|---|---|
| 3,700,623 | 10/1972 | Keim | 526/23 |
| 3,833,531 | 9/1974 | Keim | 260/29.6 CM |
| 3,840,504 | 10/1974 | Keim | 528/392 |
| 4,129,528 | 12/1978 | Petrovich et al. | 260/823 |

*Primary Examiner*—Hosea E. Taylor
*Assistant Examiner*—Amelia B. Yarbrough
*Attorney, Agent, or Firm*—David Bennett; William J. Farrington; Edward P. Grattan

[57] ABSTRACT

An improved wet strength resin prepared from a polyamine and an epihalohydrin is obtained with improved yield if the polyamine is formed by the polymerization of a quaternary amine in the presence of an anion derived from an acid in which the final pKa is less than 2.

4 Claims, No Drawings

POLYAMINE/EPIHALOHYDRIN REACTION PRODUCTS

BACKGROUND OF THE INVENTION

This invention relates to the products obtained by reacting a polyamine salt with an epihalohydrin. Such products are widely used as additives to improve the wet and dry strength of paper products. More particularly, the invention describes an improved process by which such additives may be obtained with greater efficiency.

DISCUSSION OF THE PRIOR ART

U.S. Pat. No. 3,700,623 describes a water-soluble resinous reaction product of (A) a linear polymer comprising units of the formula

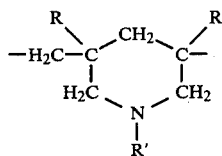

where R is a hydrogen or lower alkyl, and R' is hydrogen, alkyl or a substituted alkyl group wherein the substituent is a group which will not interfere with polymerization through a vinyl double bond and is selected from the group consisting of carboxylate, cyano, ether, amino, amide, hydrazide and hydroxyl groups and (B) from about 0.5 to about 1.5 moles of an epihalohydrin per mole of secondary plus tertiary amine present in said polymer, said product being formed at a temperature of from about 30° to about 80° C. and a pH of from about 7 to about 9.5.

Two divisional applications claiming the above U.S. patent as the parent were issued as U.S. Pat. Nos. 3,833,531 and 3,840,504. These claim respectively, a process for making the product claimed in U.S. Pat. No. 3,700,623 and a specified amine copolymer/epihalohydrin reaction product.

The basic process claimed in U.S. Pat. No. 3,833,531 comprises
(1) reacting in aqueous solution
 (a) a linear polymer wherein from 5 to 100% of the recurring units have the formula

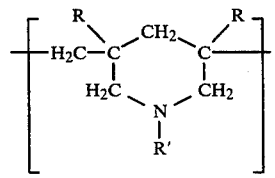

where R is hydrogen or lower alkyl and R' is alkyl or a substituted alkyl group wherein the substituent is a group which will not interfere with polymerization through a vinyl double bond and is selected from the group consisting of carboxylate, cyano, ether, amino, amide, hydrazide and hydroxyl groups with (b) from about 0.5 to about 1.5 moles of an epihalohydrin per mole of secondary plus tertiary amine present in said polymer at a temperature of about 30° to about 80° C. and a pH from about 7 to about 9.5 to form a water-soluble resinous reaction product containing epoxide groups; and then
(2) reacting the resinous reaction product, in aqueous solution, with from about 0.3 equivalent to about 1.2 equivalent per equivalent of epihalohydrin of a water-soluble acid selected from the group consisting of hydrogen halide acids, sulfuric acid, nitric acid, phosphoric acid, formic acid and acetic acid until the epoxide groups are converted substantially to the corresponding halohydrin group and an acid-stabilized resin solution is obtained.

The polyamine which is reacted with the epichlorohydrin in the process described in the above patent is prepared by polymerizing the hydrohalide salt of a diallylamine having the formula

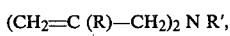

(CH$_2$=C (R)—CH$_2$)$_2$ N R', wherein each R is independently selected from the group consisting of hydrogen and lower alkyl groups and R' is hydrogen, or an alkyl or substituted alkyl group, either alone or as a mixture with other copolymerizable monomers in the presence of a free radical catalyst and then neutralizing the salt to give the polymer free base.

It has now been found that the manner in which this polyamine is prepared has a very significant effect on the properties and efficacy of the final product as a wet strength resin and the efficiency of the reaction by which the final product is obtained.

STATEMENT OF THE INVENTION

The present invention describes a process for the production of an acid stabilized resin solution which process comprises (A) polymerizing an aqueous solution of a diallyl amine salt having the formula [(CH$_2$=C (R)—CH$_2$)$_2$ NHR'$\oplus$]$_n$ X $^{n-}$; wherein the R groups are the same or different and are selected from hydrogen and lower alkyl groups, R' is selected from hydrogen alkyl and substituted alkyl groups and X $^{n-}$ is an anion other than a halide anion derived from an acid in which the final pKa is less than 2 and n is an integer from 1 to 3 and is the valence of the anion; either alone or as a mixture with other copolymerizable monomers, in the presence of a free radical catalyst to form a polymer in which from 5 to 100% of the recurring units are derived from the diallylamine:

(B) raising the pH of the solution sufficiently to convert part or all of the monomeric and polymeric amine salt functionalities to free amine groups but not so high as to precipitate the polyamine from solution;

(C) reacting the polyamine with from about 0.5 to about 1.5 mole of an epihalohydrin per mole equivalent of secondary plus tertiary amine present in said solution, at a temperature of about 30° to about 80° C. and a pH from about 7 to about 9.5, to form a water-soluble resinous reaction product containing epoxide groups; and (D) reacting the resinous reaction product in aqueous solution, with from about 0.3 equivalents to about 1.2 equivalents per equivalent of epihalohydrin of a water-soluble acid selected from the group consisting of hydrogen halide acids, sulfuric acid, nitric acid, phosphoric acid, formic acid and acetic acid until an acid-stabilized resin solution is obtained.

Conventionally the polyamine is produced by the polymerization of the diallylamine in the presence of a hydrohalide acid and after the formation of the polymer is complete, the pH is raised to liberate the polyamine which is then reacted with an epihalohydrin. Thus, the reaction mixture contains a large amount of halide ion associated with the polyamine halide salt.

It has now been found that the epihalohydrin reacts with such halide ion in accordance with the following reaction:

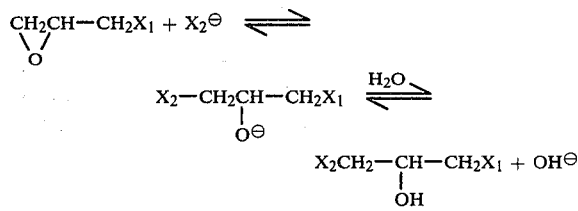

where $X_1$ and $X_2$ are the same or different halogen atoms.

Thus, epihalohydrin is removed from the reaction mixture as dihalopropanol and is thus unable to react with the polyamine. The dihalopropanol itself it much less reactive towards amines than is the epihalohydrin. This competing reaction is therefore, a serious limitation on the efficiency with which the expensive epihalohydrin can be used in the formation of the final polymeric adduct.

Up till now the most effective way to overcome this defect was to separate the polyamine from the halide-containing reaction mixture in which it was formed as is disclosed in U.S. application Ser. No. 685,227, filed Mar. 1, 1978, but this of course involves the expense of introducing an extra step into the production sequence and this is not generally a favored alternative.

It has now been found that substantially the same results can be obtained by forming the polyamine in the presence of a strong non-hydrohalide acid having a final pKa of not more than 2, such as sulphuric acid (second pKa 1.92), nitric acid (pKa 1.34), perchloric acid (pKa 0.73), trichloroacetic acid (pKa 0.64), benzene sulfonic acid (pKa 0.70) and the like. This is based on the unexpected discovery that the reaction of anions derived from such acids with epihalohydrins is very much slower than the reaction of halide ions with epihalohydrins. Thus, the extent to which the epihalohydrin reactant is removed from the reaction to form an essentially useless by-product is greatly reduced.

The term "final pKa" is used to indicate the pKa at which the ionization of the acid anion is complete. Thus, for phosphoric acid it is the pKa at which the third acid hydrogen proton is removed (12.36) and for sulphuric acid it is the pKa at which the bisulfate ion becomes the sulfate ion (1.92).

It should be noted that phosphoric and oxalic acids are excellent in amine salt polymerization and in epichlorohydrination—but seriously interfere in one or more aspects of wet strength development such as retention on pulp fibers and thermoset curing.

The wide pKa separations associated with differing H+ ionization constants in such acids as $H_3PO_4$, $H_2C_2O_4$, etc. is believed to cause the observed buffering action occurring during deliberate pH change and is characteristic of association reactions between amine (basic) and acid (acidic) groups comprising the salt.

Particularly preferred on account of their cheapness and the extreme slowness of their reaction with epihalohydrins are the nitrate ion and the sulfate ion and derived species such as the bisulfate ion.

It is also surprisingly found that the use of an amine salt other than the hydrohalide markedly speeds up the polymerization rate, that is, the rate at which the polyamine is formed. It is speculated that this may reflect the greater ability of the halide ion to act as a chain transfer agent and as a chain terminator. Whatever the cause, it is found that the conversion of monomer to polymer is substantially greater at a given point in time when the amine salt polymerized is a salt of a strong acid other than hydrohalide acid.

Specific non-halide salts of the diallylamines which can be polymerized to provide the polymer units of the invention include the sulphates, bisulphates, nitrates, perchlorates, trichloroacetates, and sulfonates of diallylamine, N-methyldiallylamine, 2,2'-dimethyl-N-methyldiallylamine, N-ethyldiallylamine, N-isopropyldiallylamine, N-n-butyldiallylamine, N-tert-butyldiallylamine, N-n-hexyldiallylamine, N-octadecyldiallylamine, N-acetamidodiallylamine, N-cyanomethyldiallylamine, N-$\beta$-propionamidodiallylamine, N-acetic ethyl ester substituted diallylamine, N-ethylmethylether substituted diallylamine, N-$\beta$-ethylaminodiallylamine, N-hydroxyethyldiallylamine and N-aceto-hydroazide substituted diallylamine.

Diallylamines and N-alkyldiallylamines, used to prepare the polymers employed in this invention, can be prepared by the reaction of ammonia or a primary amine with an allyl halide employing as a catalyst for the reaction a catalyst that promotes the ionization of the halide such, for example, as sodium iodide, zinc iodide, ammonium iodide, cupric bromide, ferric chloride, ferric bromide, zinc chloride, mercuric iodide, mercuric nitrate, mercuric bromide, mercuric chloride, and mixtures of two or more. Thus, for example, N-methyldiallylamine, in good yield, can be prepared by reaction of two moles of an allyl halide, such as allyl chloride, with one mole of methylamine in the presence of an ionization catalyst such as one of those enumerated above. To avoid the need to regenerate the amine from the salt product before polymerization, it is possible to use a non-halide allyl salt during the amine formation but such reactions often do not readily and easily occur and this technique is less preferred in general.

In preparing the homopolymers and copolymers for use in this invention, reaction can be initiated by redox catalytic system. In a redox system, the catalyst is activated by means of a reducing agent which produces free radicals without the use of heat. Reducing agents commonly used are sodium metabisulfite and potassium metabisulfite. Other reducing agents include water-soluble thiosulfates and sulfites, hydrosulfites and reducing salts such as the sulfate of a metal which is capable of existing in more than one valence state such as cobalt, iron, manganese and copper. A specified example of such a sulfate is ferrous sulfate. The use of a redox initiator system has several advantages, the most important of which is efficient polymerization at lower temperatures. Conventional peroxide catalysts such as tertiarybutyl hydroperoxide, potassium persulfate, hydrogen peroxide, and ammonium persulfate used in conjunction with the above reducing agents or metal activators, can be employed.

As stated above, the linear polymers of diallylamines which are reacted with an epihalohydrin in accordance with this invention can contain different diallylamine units and/or contain units of one or more other copolymerizable monomers. Typically, the comonomer is a different diallylamine, a monoethylenically unsaturated compound containing a single vinylidene group or sulfur dioxide, and is present in an amount ranging from 0 to 95 mole percent of the polymer. Thus, the polymers of diallylamine are linear polymers wherein from 5 to 100% of the recurring units are monomer units derived from (1) a vinylidene monomer and/or (2) sulfur dioxide. Preferred comonomers include acrylic acid, methacrylic acid, methyl and other alkyl acrylates and methacrylates, acrylamide, methacrylamide, acrylonitrile, methacrylonitrile, vinyl acetate, vinyl ethers such as the alkyl vinyl ethers, vinyl ketones, such as methyl vinyl ketone and ethyl vinyl ketone, vinyl sulfonamide, sulfur dioxide or a different diallylamine.

Specific copolymers which can be reacted with an epihalohydrin include copolymers of N-methyldiallylamine and sulfur dioxide copolymers of N-methyldiallylamine and diallylamine; copolymers of diallylamine and acrylamide, copolymers of diallylamine and acrylic acid; copolymers of N-methyldiallylamine and methyl acrylate; copolymers of diallylamine and acrylonitrile; copolymers of N-methyldiallylamine and vinyl acetate; copolymers of diallylamine and methyl vinyl ether; copolymers of N-methyldiallylamine and vinylsulfonamide; copolymers of N-methyldiallylamine and methyl vinyl ketone; terpolymers of diallylamine, sulfur dioxide and acrylamide; and terpolymers of N-methyldiallylamine, acrylic acid and acrylamide.

The epihalohydrin which is reacted with the polymer of a diallylamine can be any epihalohydrin, i.e., epichlorohydrin, epibromohydrin, epifluorohydrin, or epiiodohydrin and is preferably epichlorohydrin. In general, the epihalohydrin is used in an amount ranging from about 0.5 mole to about 1.5 moles and preferably about 1 mole to about 1.5 moles per mole of secondary plus tertiary amine present in the polymer.

The resinous reaction products of the invention can be prepared by reacting a homopolymer or copolymer of a diallylamine as set forth above with an epihalohydrin at a temperature of from about 30° C. to about 80° C., and preferably from about 40° C. to about 60° C. until the viscosity measured on a solution containing 20% to 30% solids at 25° C. has reached a range of A to E and preferably about C to D on the Gardner-Holt scale. The reaction is preferably carried out in aqueous solution to moderate the reaction, and at a pH of from about 7 to about 9.5. When the desired viscosity is reached, sufficient water is added to adjust the solids content of the resin solution to about 15% or less and the product cooled to room temperature (about 25° C.). The resin solution obtained is then stabilized by adjusting to a pH of at least about 6 and preferably to a pH of below about 5. Any suitable acid such as hydrochloric, sulfuric, nitric, formic, phosphoric and acetic acid can be used to adjust the pH.

The aqueous resin solutions can be applied to paper or other felted cellulosic products by tub application or by spraying, if desired. Thus, for example, preformed and partially or completely dried paper can be impregnated by immersion in, or spraying with, an aqueous solution of the resin, following which the paper can be heated for about 0.5 minute to 30 minutes at temperatures of 90° C. to 100° C. or higher to dry same and cure the resin to a water-insoluble condition. The resulting paper has greatly increased wet and dry strength, and therefore this method is well suited for the impregnation of paper such as wrapping paper, bag paper and the like, to impart both wet and dry strength characteristics thereto.

The preferred method of incorporating these resins in paper, however, is by internal addition prior to sheet formation, whereby advantage is taken of the substantivity of the resins for hydrated cellulose fibers. In practicing this method, an aqueous solution of the resin in its uncured and hydrophilic state is added to an aqueous suspension of paper stock in the beater, stock chest, Jordan engine, fan pump, head box or at any other suitable point ahead of sheet formation. The sheet is then formed and dried in the usual manner.

The "off-the-machine" wet strength obtained with the resins of the invention will be satisfactory for most applications. Additional wet strength can be obtained by subjecting the paper to a heat treatment. Satisfactory temperatures will be of the order of from about 105° C. to about 150° C. for a period of time from about 12 to 60 minutes, time varying inversely with temperature.

While the reaction products herein described impart substantial wet strength to paper they also improve the dry strength of paper when present in relatively small amounts. The reaction products obtained by the process of the invention can be added to a fibrous cellulosic substrate such as paper in amounts that can range up to 15 kilos per metric ton of substrate. Generally, the levels of addition in commercial operations is from 1 to 10 and especially from 2 to 8 kilos per metric ton.

DESCRIPTION OF THE PREFERRED EMBODIMENTS

The following Examples are illustrative of the invention only and are not intended to imply any limitation or restriction thereof.

Example 1 describes the test method used to evaluate acids which may be used to form the amine salts before polymerization. The other Examples describe the production of polyamine adducts and the performance of such adducts as wet strength additives when applied to cellulosic substrates.

EXAMPLE 1

The fundamental discovery underlying this invention is that halide ions react much more rapidly with epihalohydrin than do anions derived from other strong acids. This Example describes a method by which the various anions can be compared under readily reproducible conditions. It is based on the fact that the reaction between the epihalohydrin and the anion releases hydroxyl ions which therefore raise the pH of the reaction mixture. The extent to which the pH rises is therefore an indication of the extent of the reaction; the rapidity with which the pH rises is indicative of the rate of the forward reaction.

Saturated solutions in deionized water at 25° C. of the sodium salts of each of the anions to be evaluated were prepared and 20 ml. of each solution were added to separate vials and 0.067 gram of AR epichlorohydrin was added to each. Each vial was capped and shaken vigorously. The pH of each was taken at the indicated time intervals. The results are set forth in Table 1.

TABLE 1

| Salt Solution | pH at indicated time | | | |
|---|---|---|---|---|
| | 0 sec. | 10 sec. | 10 min. | 18 hrs. |
| Sodium chloride | 6.41 | 9.05 | — | 9.33 |
| Sodium sulfate | 6.35 | 6.37 | 6.58 | 7.71 |

The very rapid increase in pH shown by the sodium chloride solution/epichlorohydrin mixture is indicative of the extent of the interference of this reaction with the polyamine/epihalohydrin reaction in the process of the prior art. Conversely, the non-halide salts show a very much slower byproduct reaction.

EXAMPLE 2

This Example describes the production of a wet-strength resin by the process of the invention.

A flask was fitted with an addition funnel, a thermometer, a stirrer and a nitrogen inlet tube. The flask was charged with 222.4 grams (2.0 moles) of flash-distilled N-methyldiallylamine and 200 ml. of deionized water. To the flask were added 204.1 grams of 50% by weight aqueous solution of 96% sulfuric acid. The addition was done at 10°–15° C. After all the acid had been added 14.3 grams of deionized water were added along with 1–2 drops of 96% sulfuric acid to adjust the pH to 3.5. The flask and contents were then nitrogen purged to remove air.

To this amine salt solution were added 10.0 grams of 50% aqueous ammonium persulfate solution and while blanketing with nitrogen throughout, the temperature was raised to 50° C. The reaction became strongly exothermic and for a brief period, after about 90 minutes, the temperature rose to 90° C. before being controlled and reduced to 60° C. where it remained for the rest of the polymerization. After two hours, the solution had become very viscous and orange in color. A further 4.00 grams of the 50% ammonium persulfate solution were added to finish off the reaction. After six hours of stirring under a nitrogen blanket the reaction was shut down and a viscous organic resin solution remained. Analysis of this solution showed that a conversion (monomer to polymer) of 96.8% had been achieved.

A charge of 43.3 grams (0.10 monomer unit equivalent) of the poly(N-methyldiallylamine)sulphate salt prepared above was placed in a flask and 65.4 grams of water and 4.50 grams of 10% aqueous sodium hydroxide were added to raise the pH to 8.42. The temperature of the mixture was 10° C.

The dropwise addition of 9.25 grams (0.10 mole) of epichlorohydrin to the stirred polyamine was begun. The stirred reaction mixture was initially maintained at 10° C. for 15 minutes after which the temperature was allowed to rise to 50° C. During the reaction at 50° C. until the time the reaction was killed, the mixture became more viscous and the pH slowly dropped. A total of 20 equiv. % of 10% sodium hydroxide was added incrementally to maintain the reaction pH above 7.

After 200 minutes the reaction was killed by addition of 0.80 gram of 96% sulphuric acid with stirring and cooling.

The resulting polymer adduct had a Gardner viscosity of E⁻ and a pH at 25° C. of 2.31.

Two further polymeric adducts according to the invention were prepared by essentially the same process as is set forth above in Example 2. For purposes of comparison a polymeric adduct was prepared according to the prior art, i.e., using the hydrochloride salt of the amine produced by an otherwise similar method. The results obtained are set forth in Table II below.

TABLE II

| | | SUMMARY OF EXAMPLES 2–4 | | | | | | | | |
|---|---|---|---|---|---|---|---|---|---|---|
| | | EPIHALOHYDRIN | | | | POLYMERIC ADDUCT | | | | |
| Example | Polymer Adduct Identification | Ratio E/A$^{(1)}$ | Added NaOH$^{(2)}$ | pH at 25° C. | % Solids | Gardner Viscosity | Resin Yield | Epi Conv. | % DCP$^{(3)}$ | Note |
| 2 | Poly(N-methyldiallylamine. H$_2$SO$_4$ salt)/Epi | 1.0 | 0.31 | 2.31 | 16.43 | E⁻ | 97.9% | 96.4% | 1.25 | A |
| 3 | Poly(N-methyldiallylamine. H$_2$SO$_4$ salt)/Epi | 0.8 | 0.26 | 2.33 | 16.76 | E | 99.5% | 97.6% | 0.96 | A |
| 4 | Poly(N-methyldiallylamine/diallylamine H$_2$SO$_4$ salt)/Epi$^{(4)}$ | 1.0 | 0.26 | 2.85 | 20.43 | N | 99.2% | 95.8% | 1.48 | B |
| Comparative | Poly(N-methyldiallylamine. HCl Salt)-Epi | 0.8 | 0.26 | 2.0 | 15.45 | E/E⁺ | 91.4% | 91.2% | 3.07 | C |

$^{(1)}$Ratio of equivalents of epihalohydrin to amine monomer unit equivalents.
$^{(2)}$Equivalents per monomer unit equivalent of amine.
$^{(3)}$Weight percent of dichloropropanol in the final reaction mixture adjusted to 25% by weight of total solids.
$^{(4)}$N-methyldiallylamine/diallylamine are in a 1:1 molar ratio.
A Polyamine obtained in 96.8% conversion from monomer after 6 hours. (56.4% in 1.0 hour).
B Polyamine obtained in 97.8% conversion from monomers after 6 hours.
C Polyamine obtained in only 84.8% conversion from monomer after 72 hours. Polyamine therefore contained 15.2% of unconverted monomer.

The data given in Table II clearly show that the process of the invention gives much better results by comparison with the prior art process in that:

1. the formation of the polymer proceeds much more quickly and reaches a higher monomer to polymer conversion level;
2. the efficiency with which the epichlorohydrin is incorporated into the polymeric adduct is greater; and
3. the amount of dichloropropanol by-product obtained is more than halved.

EXAMPLE 5

This example shows the cured and uncured wet tensile strengths obtained when the polymeric adducts of Examples 2 to 4 are applied to a cellulosic substrate in the manner described in Example 6 and compares them with the values obtained using the comparative adduct described in Table II.

The results are set forth in Table III below.

TABLE III

| | CURED AND UNCURED WET TENSILE STRENGTHS IN g/cm. | | | | | |
|---|---|---|---|---|---|---|
| | Uncured Application Level kg/metric ton | | | Cured Application Level kg/metric ton | | |
| Example | 2.5 | 5.0 | 7.5 | 2.5 | 5.0 | 7.5 |
| 2 | 430 | 593 | 697 | 523 | 664 | 773 |
| 3 | 371 | 532 | 629 | 447 | 593 | 670 |
| 4 | 307 | 416 | 557 | 379 | 500 | 602 |

TABLE III-continued

CURED AND UNCURED WET TENSILE STRENGTHS IN g/cm.

| | Uncured Application Level kg/metric ton | | | Cured Application Level kg/metric ton | | |
|---|---|---|---|---|---|---|
| Example | 2.5 | 5.0 | 7.5 | 2.5 | 5.0 | 7.5 |
| Comparative | 384 | 500 | 609 | 447 | 561 | 682 |

This table shows that the effect of changing the salt carries through to the wet-strengths obtained. This efficiency difference is perhaps attributable at least in part to the presence of the larger proportion of unreacted monomer in the polyamine adduct prepared using the polyamine chloride salt. Note that Example 4 was prepared using an amine copolymer and therefore, is not strictly comparable with the other data reported in this table.

EXAMPLE 6

This Example sets forth a comparison of wet strength resins in which the amine prepolymer is produced (A) in the form of the chloride salt (the prior art); and (B) in the form of the nitrate salt (the invention).

PRODUCTION OF RESIN (PRIOR ART)

1. Production of Prepolymer

A reaction vessel was charged with 222.4 g (2.0 moles) of flash-distilled N-methyldiallylamine, 200 g of deionized water and 219.4 g of 36% concentrated hydrochloric acid. This produced a solution with a pH of 3.5 and an amine hydrochloride salt concentration of 45.0% by weight. The addition was preformed at 10°–15° C. with the hydrochloric acid being added dropwise with good stirring and cooling to maintain the temperature in the above range. The two phase reaction mixture cleared rapidly as the pH dropped below about 6 to 7. A nitrogen purge was introduced and the system was left overnight at 0°–22° C.

To the above reaction mixture was added, in one charge, 5.00 g of ammonium persulfate ("APS") solids in the form of 11.5 g of a 45% aqueous solution. The nitrogen purge was continued while the reaction vessel was heated to 50° C., with continued stirring, over a period of 30 minutes.

At about 45° C. the reaction became exothermic and air jet cooling was initiated to maintain the temperature at about 50° C. At 0.75 hr. an increase in viscosity was noted and at 2.5 hrs. the exotherm subsided and gentle heating was initiated to maintain the reaction temperature. The reaction was continued under nitrogen, with stirring, at 50° C. for a further 2½ days after which a solution containing 44.85% total solids, (44.10% in terms of monomer-derived solids), having a pH of 1.52 and a Gardner viscosity of E/E+ was obtained. The process is summarized in Table IV.

2. Preparation Wet/Dry Strength Resin

A reaction vessel was charged with 33.37 g (0.10 amine monomer unit equivalents) of the amine prepolymer solution prepared above. The total solids charged (theory) was 14.966 g. In addition 4.50 g. (0.01125 equivalent) of a 10% aqueous sodium hydroxide solution and 67.86 g. of water were charged into the vessel. The resultant pH was 8.35

The reaction commenced at 10° C. when 7.40 g. (0.08 mole) of epichlorohydrin was added over a 1 minute period with stirring. Over the next hour the temperature rose to 50° C., the solution first became turbid and then cleared and the pH dropped to below 7.80.

At intervals during the reaction dropwise additions of 2.0 g. amounts of 10% aqueous sodium hydroxide were made to maintain the pH above 7.

After a little more than three hours the Gardner viscosity had risen to F/G and the reaction was killed, (i.e. short-stopped) by addition of 0.50 g. of 96% sulphuric acid with continued stirring and cooling.

The properties of the final solution are set forth in detail in Table V below.

Production of Resin B (Illustrative of the Invention)

1. Production of the Prepolymer

A reaction vessel was charged with 111.18 g. (1.00 mole) of N-methyldiallylamine, 90.0 g. (1.00 equivalent of hydrogen ion) of 70% AR nitric acid and 147.18 g. of deionized water. The initial pH at 25° C. was 4.55.

This amine salt solution was then polymerized using a solution of 2.25 g. of AR ammonium persulfate in 2.25 g. of deionized water at a temperature of 60° C.

The formation of the amine salt and the polymerization technique followed substantially the same procedures as were outlined in the corresponding description of the preparation of Resin A with the difference that the polymerization reaction was complete after 10 hours. The process is summarized in Table IV.

The Gardner viscosity of the prepolymer after adjustment to 45% total solids by addition of water was E/E+ and the pH at 25° C. was 1.34.

2. Reaction with Epichlorohydrin

A reaction vessel was charged with 39.21 g. (0.100 amine monomer unit equivalent) of the amine prepolymer salt produced as described above. To the same vessel were added 75.6 g. of deionized water and 4.50 g. (0.01125 equivalent) of 10% aqueous sodium hydroxide solution. This solution then was clear and had a pH of 8.37.

The reaction was begun by addition of 7.40 g. (0.08 mole) of epichlorohydrin over a 1 minute period to the above reaction mixture at 10° C. The reaction was continued in the manner described above in relation to the preparation of Polymer A.

The properties of the final Polymer B are set forth in Table V below.

TABLE IV

POLY(AMINE SALT) SYNTHESES

| | Polymer Salt Prepared | |
|---|---|---|
| | Poly(N-methyldiallylamine HCl Salt) | Poly(N-methyldiallylamine HNO$_3$ Salt) |
| Reaction Parameters and Conditions Employed [1] | | |
| Amine Salt Charged Moles | 2.00 | 1.00 |
| (NH$_4$)$_2$ S$_2$O$_8$ g/amine salt, moles | 5.00 | 2.25 |
| Temp. C.°/ Time, Hrs. | 50° C./72 hrs. | 60° C./10 hrs. |
| Run Conc. % | 45% | 50% |
| M/P Conversion, % [2] | 84.8% | 93.1% |
| Aqueous Poly(Amine Salt) Solution Properties | | |
| Solution Conc. % | 44.85% | 45.10% |
| Gardner Viscosity | E/E+ | E/E+ |
| Solution pH | 1.52 | 1.34 |
| Monomer Unit Equiv. | | |

TABLE IV-continued
POLY(AMINE SALT) SYNTHESES

| | Polymer Salt Prepared | |
|---|---|---|
| | Poly(N-methyldi-allylamine HCl Salt) | Poly(N-methyldi-allylamine HNO₃ Salt) |
| Wt., gms. (3) | 333.65 g. | 392.07 g. |

(1) Stirred 4-necked round bottomed flask, $N_2$ blanketed throughout.
(2) Determined gravimetrically, via double precipitation of resin from A.R. acetone.
(3) Grams aqueous resin solution obtained divided by amine salt moles (equivalents) charged.

TABLE V
EPICHLOROHYDRINATIONS OF POLY(AMINE SALTS)

| | Polymer Salt Employed | |
|---|---|---|
| | Poly(N-methyldi-allylamine HCl Salt) (Polymer A) | Poly(N-methyldi-allylamine HNO₃ Salt) (Polymer B) |
| Reaction Parameters and Conditions Employed | | |
| NaOH, Eq. % (1) | 22.5 | 25.0 |
| pH Range at °C. | 8.35–7.11 | 8.37–6.31 |
| E/A (2) | 0.80 | 0.80 |
| Conc., % | 20% | 20% |
| Temp. C° (3) | 10° C.→ 50° C. | 10° C.→ 50° C. |
| 'Kill' Viscosity | | |
| Gardner (4) | F/G | H |
| Reaction Time. Hrs. | 3:05 | 3:30 |
| Resin (EPI Adduct) Solution Properties | | |
| Resin Yield % (5) | 91.0% | 101.3% |
| Conc., % | 15.39% | 17.34% |
| Gardner Viscosity (4) | D⁺/E⁻ | E⁺/F⁻ |
| Solution pH | 2.00 | 2.07 |
| % DCP at T.S. found (6) | 2.04% | 0.72% |
| EPI Conv., % (7) | 61.9% | 89.3% |

(1) An initial addition of 11.25 equivalent % of 10% NaOH raised the solution pH from 1.5 to 8.3–8.4; thereafter, incremental addition was maintained as needed to build solution viscosity.
(2) Moles epi/amine monomer unit equivalent charged.
(3) Initial 10° C. temp.; gradual rise to viscosity building temp. to 50° C.
(4) at room temperature.
(5) (Determined solids/theoretical solids) × 100.
(6) Via G.L.C. analysis resin solution.
(7) Based on determination of DCP (dichloropropanol).

EPI Conversion (%) = 100 −

$$\left[ \frac{(\% \text{ DCP @ T.S.}) (\text{Prepn. wt. in g}) (0.7173)}{\text{EPI charged in g.}} \right]$$

where 0.7173 = MW ratio $\frac{\text{EPI}}{\text{DCP}}$

PREPARATION OF PAPER

A pulp of 50/50 bleached softwood and hardwood Kraft with Canadian Standard Freeness of about 450 and a pH of 7.0 was treated with the appropriate amount of resin and the treated pulp was made into a 8 inch square handsheet. The press consistency was 36.1% and the paper sheet was dried at 95° C. to a moisture level of 4.1% using a drum rotation speed of 2 minutes per revolution.

To measured aliquot samples of the above pulp slurry were added, with stirring, measured amounts of the appropriate resin. Prior to addition to the pulp slurry the polymers were activated by the addition, over several seconds, of 7.0 meq. of 25% aqueous sodium hydroxide per gram of resin solids; the resin concentration was pre-adjusted to 3.0% solids with deionized water. The activated mixture was stirred throughout the NaOH addition and then for 1.0 minute at room temperature before being finally diluted to 1.2% concentration by addition of more deionized water.

WET STRENGTH TESTING

The wet tensile strengths of Polymers A and B are compared in Table VI. The cured samples had been subjected to heating at 90° C. for 15 minutes. The uncured samples were tested straight from the paper-production operation. Both were wetted before testing on an Instron Tensile Tester.

TABLE VI
WET STRENGTH OF PAPERS TESTED POLYMERS A AND B AT DIFFERENT ADDITION LEVELS

| Polymer | Addition Level in Kg/metric ton | Uncured Tensile Strength in g/cm (Average of 4) | Cured Tensile Strength in g/cm (Average of 4) |
|---|---|---|---|
| A (Prior Art) | 2.5 | 329 | 482 |
| | 5.0 | 443 | 666 |
| | 7.5 | 518 | 747 |
| B (Invention) | 2.5 | 411 | 639 |
| | 5.0 | 529 | 830 |
| | 7.5 | 647 | 1023 |

From this it can be seen that the wet tensile strength of the Polymer B produced using the nitrate salt is very much more effective than that produced using the chloride salt.

Moreover, comparison of the results in Tables IV and V shows that it is produced very much more efficiently with fewer by-products.

The above Examples are for illustration only and are not intended to imply any limitation of the invention. It will be appreciated that many minor variations and additions might be made without changing the essential nature of the invention. It is intended that all such variations and additions shall be embraced within the purview of this invention.

What is claimed is:

1. A process for the production of an acid stabilized resin solution which process comprises
    (A) polymerizing an aqueous solution of a diallylamine salt having the formula [(CH₂=C(R)—CH₂)₂ NHR'⊕]ₙ X ⁿ⁻, wherein the R groups are the same or different and are selected from hydrogen and lower alkyl groups, R' is selected from hydrogen, alkyl and substituted alkyl groups, X ⁿ⁻ is an anion selected from sulfate, bisulfate and nitrate in which the final pKa is less than 2 and n is an integer from 1 to 3 and is the valence of the anion; either alone or as a mixture with other co-polymerizable monomers, selected from the group consisting of different diallylamines, monoethylenically unsaturated compounds containing a single vinylidene group and sulfur dioxide, in the presence of a free radical catalyst to form a polymer in which from 5 to 100% of the recurring units are derived from the diallylamine;
    (B) raising the pH of the solution sufficiently to convert part or all of the monomeric and polymeric amine salt functionalities to free amine groups but not so high as to precipitate the polyamine from solution;
    (C) reacting the polyamine with from about 0.5 to about 1.5 moles of an epihalohydrin per mole equivalent of secondary plus tertiary amine present in said solution, at a temperature of about 30° to about 80° C. and a pH from about 7 to about 9.5, to form a water-soluble resinous reaction product containing epoxide groups; and (D) reacting the resinous reaction product in aqueous solution, with from about 0.3 equivalents to about 1.2 equivalents per equivalent of epihalohydrin of a water-soluble acid selected from the group consisting of hydrogen halide acids, sulfuric acid, nitric acid, phosphoric acid, formic acid and acetic acid until an acid-stabilized resin solution is obtained.

2. The process of claim 1 in which the diallylamine salt is a salt of N-methyldiallylamine.

3. The process of claim 1 in which the polyamine salt produced in (A) is selected from the sulfate, bisulfate and nitrate salts of poly(N-methyldiallylamine).

4. An improved wet strength additive produced by a process according to claim 1.

* * * * *